(12) United States Patent
Kim et al.

(10) Patent No.: US 7,450,477 B2
(45) Date of Patent: Nov. 11, 2008

(54) OPTICAL PICKUP HAVING A POLARIZATION BEAM SPLITTER

(75) Inventors: Bong-gi Kim, Suwon-si (KR); Soo-han Park, Yongin-si (KR); Chun-seong Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 618 days.

(21) Appl. No.: 10/993,443

(22) Filed: Nov. 22, 2004

(65) Prior Publication Data
US 2006/0109766 A1    May 25, 2006

(51) Int. Cl.
*G11B 7/13* (2006.01)
(52) U.S. Cl. .................. 369/44.41; 369/112.21
(58) Field of Classification Search ............. 369/13.32, 369/44.41, 47.45, 53.23, 53.28, 13.28–13.31
See application file for complete search history.

(56) References Cited

U.S. PATENT DOCUMENTS

| | | | | |
|---|---|---|---|---|
| 4,841,508 A | * | 6/1989 | Kimura | 369/44.41 |
| 4,951,274 A | * | 8/1990 | Iwanaga et al. | 369/13.32 |
| 5,084,850 A | * | 1/1992 | Yanagawa et al. | 369/44.41 |
| 5,084,851 A | * | 1/1992 | Noda et al. | 369/44.42 |
| 6,567,353 B1 | * | 5/2003 | Kubo et al. | 369/44.41 |
| 2002/0154582 A1 | * | 10/2002 | Yonezawa et al. | 369/53.28 |

* cited by examiner

*Primary Examiner*—Joseph Feild
*Assistant Examiner*—Nathan Danielsen
(74) *Attorney, Agent, or Firm*—Roylance, Abrams, Berdo & Goodman, LLP

(57) ABSTRACT

An optical pickup which can remove birefringence due to the non-uniformity of an optical recording medium by using a polarization beam splitter. The optical pickup includes a light source emitting a laser beam, a beam splitter reflecting part of incident light and straight transmitting the remaining light to change a proceeding path of the incident light, an objective lens focusing the incident light passed through the beam splitter to form a light spot on an optical recording medium, a polarization beam splitter arranged on an optical path between the beam splitter and the objective lens for transmitting light having one polarization and reflecting light having a different polarization. The optical pickup further includes a first photodetector for receiving the light having one polarization which is reflected from the optical recording medium and is transmitted by the polarization beam splitter and passes through the beam splitter, and a second photodetector for receiving the light having a different polarization reflected from the optical recording medium that is reflected by the polarization beam splitter. An information signal and error signals are then determined from a signal detected by the first and second photodetectors.

4 Claims, 4 Drawing Sheets

OPTICAL PICKUP HAVING A POLARIZATION BEAM SPLITTER

CROSS-REFERENCE TO RELATED APPLICATIONS

This application includes material related to Korean Patent Application No. 2002-70062, filed in the Korean Intellectual Property Office on Nov. 12, 2002, and which was laid open on May 20, 2004 in Korea, the entire contents of which are incorporated herein by reference.

BACKGROUND OF THE INVENTION

1. Field of the Invention

The present invention relates to an optical pickup which can remove birefringence due to the non-uniformity of an optical recording medium. More particularly, the present invention relates to an optical pickup which can remove birefringence due to the non-uniformity of an optical recording medium by using a polarization beam splitter.

2. Description of the Related Art

In general, an optical pickup records information on an optical recording medium and/or reproduces information therefrom in a non-contact manner using light emitted from a light source.

Referring to FIG. 1, a conventional optical pickup includes a light source 1 emitting light, a beam splitter 5 changing a proceeding direction of incident light, an objective lens 11 arranged on an optical path between the beam splitter 5 and the optical recording medium 13 to converge the incident light on an optical recording medium 13, a collimating lens 7 arranged on the optical path between the beam splitter 5 and the objective lens 11 to converge incident divergent light to a parallel beam, and a photodetector 17 for receiving light reflected from the optical recording medium 13 and detecting an information signal and error signals.

The beam splitter 5 is a polarization beam splitter which reflects one polarized light and transmits the other polarized light. That is, in the optical arrangement shown in FIG. 1, the light emitted from the light source 1 is reflected to proceed toward the optical recording medium 13, while the light reflected from the optical recording medium 13 is allowed to pass through the beam splitter 5 and proceed toward the photodetector 17.

A quarter wave plate 9 is provided on the optical path between the beam splitter 5 and the objective lens 11 to make a circularly polarized beam incident on the optical recording medium 13. The quarter wave plate 9 converts an incident linearly polarized beam into a circularly polarized beam, and the circularly polarized beam into the linearly polarized beam.

The photodetector 17 includes a plurality of section plates that independently receive light and perform photoelectric conversions, and which further detects an information signal recorded on the optical recording medium 13, a track error signal, and a focus error signal by selectively differential amplifying and summing signals at each of the section plates.

A three beam method is widely used to detect the track error signal. For this use, a grating 3 is provided on the optical path between the light source 1 and the beam splitter 5 to diffract and transmit incident light as the $0^{th}$ order light, $\pm1^{st}$ order light, $\pm2^{nd}$ order light, and so on.

An astigmatism method is also widely used to detect the focus error signal. For this use, an astigmatism lens 15 is provided on the optical path between the beam splitter 5 and the photodetector 17. The astigmatism lens 15 is inclined in a direction that is reverse to a direction in which the beam splitter 5 is inclined to correct coma aberration.

The optical recording medium 13 is a disc type optical recording medium such as a compact disc (CD) or a digital versatile disc (DVD). The optical recording medium 13 is manufactured by pressing resin injected in a mold so that, in some cases, the resin may be formed non-uniformly in a space in the mold. The density of the optical recording medium that varies according to the degree of non-uniformity. Thus, when information is recorded/reproduced with respect to portions of the optical recording medium having different densities, a refracting angle of the incident light varies as if passing through media having different refractive indices. Thus, the non-uniformity of a medium causes a birefringence phenomenon.

When light is incident on a portion of the optical recording medium 13 where the density thereof satisfies a desired standard, and on a portion of the optical recording medium 13 where the density thereof does not satisfy the desired standard, different refraction phenomenon occurs. Thus, the refracting angle becomes different and can be divided into light having a desired polarization and light having a different polarization. The amount of polarization is dependent on a degree of the birefringence.

The reflection and transmission properties of the beam splitter 5 are set to satisfy the polarization property of a beam emitted from the light source 1 so as to transmit and allow only light having a normal polarization to proceed toward the photodetector 17. That is, light having an abnormal polarization does not proceed on to the photodetector 17. Thus, the amount of light decreases at a portion of the optical recording medium 13 where the density thereof varies.

The optical recording medium 13 is rotated by being installed on a spindle motor (not shown). Thus, recording/reproducing of information is periodically performed with respect to the portion where the density varies so that the increase and decrease in the size of a signal received through the photodetector shows periodicity. Such periodicity lowers reproduction performance and works as an error in spite of signal reproduction and signal change.

According, a need exists for a system and method to remove or minimize the undesired effects due to the non-uniformity of an optical recording medium.

SUMMARY OF THE INVENTION

To solve the above and/or other problems, the present invention provides an optical pickup which can remove birefringence due to the non-uniformity of an optical recording medium by using a polarization beam splitter.

According to an aspect of the present invention, an optical pickup comprises a light source emitting a laser beam, a beam splitter reflecting part of the incident light and straight transmitting the remaining light to change a proceeding path of the incident light, an objective lens for focusing the incident light passed through the beam splitter to form a light spot on an optical recording medium, and a polarization beam splitter arranged on an optical path between the beam splitter and the objective lens for transmitting light having one polarization of incident light and reflecting light having a different polarization. The optical pickup further comprises a first photodetector receiving the light having one polarization, that is, the light reflected from the optical recording medium that is transmitted by the polarization beam splitter and which passes through the beam splitter, and a second photodetector receiving the light having a different polarization, that is, the light reflected from the optical recording medium that is reflected by the polarization beam splitter, wherein an information signal and error signals are detected from a signal detected by the first and second photodetectors.

According to another aspect of the present invention, an optical pickup comprises a light source emitting a laser beam, a beam splitter reflecting part of the incident light and straight transmitting the remaining light to change a proceeding path of the incident light, an objective lens for focusing the incident light passed through the beam splitter to form a light spot on an optical recording medium, and a polarization beam splitter arranged on an optical path of the incident light that is reflected from the optical recording medium and which passes through the beam splitter for transmitting light having one polarization of the incident light and reflecting light having different polarization. The optical pickup further comprises a first photodetector receiving the light having one polarization, that is, the light that is transmitted by the polarization beam splitter, and a second photodetector receiving the light having different polarization that is reflected by the polarization beam splitter, wherein an information signal and error signals are detected from a signal detected by the first and second photodetectors.

BRIEF DESCRIPTION OF THE DRAWINGS

The above and other objects, features and advantages of the present invention will become more apparent by describing in detail preferred embodiments thereof with reference to the attached drawings in which.

Throughout the drawings, like reference numerals will be understood to refer to like parts, components and structures.

DETAILED DESCRIPTION OF THE EXEMPLARY EMBODIMENTS

Figure 1:
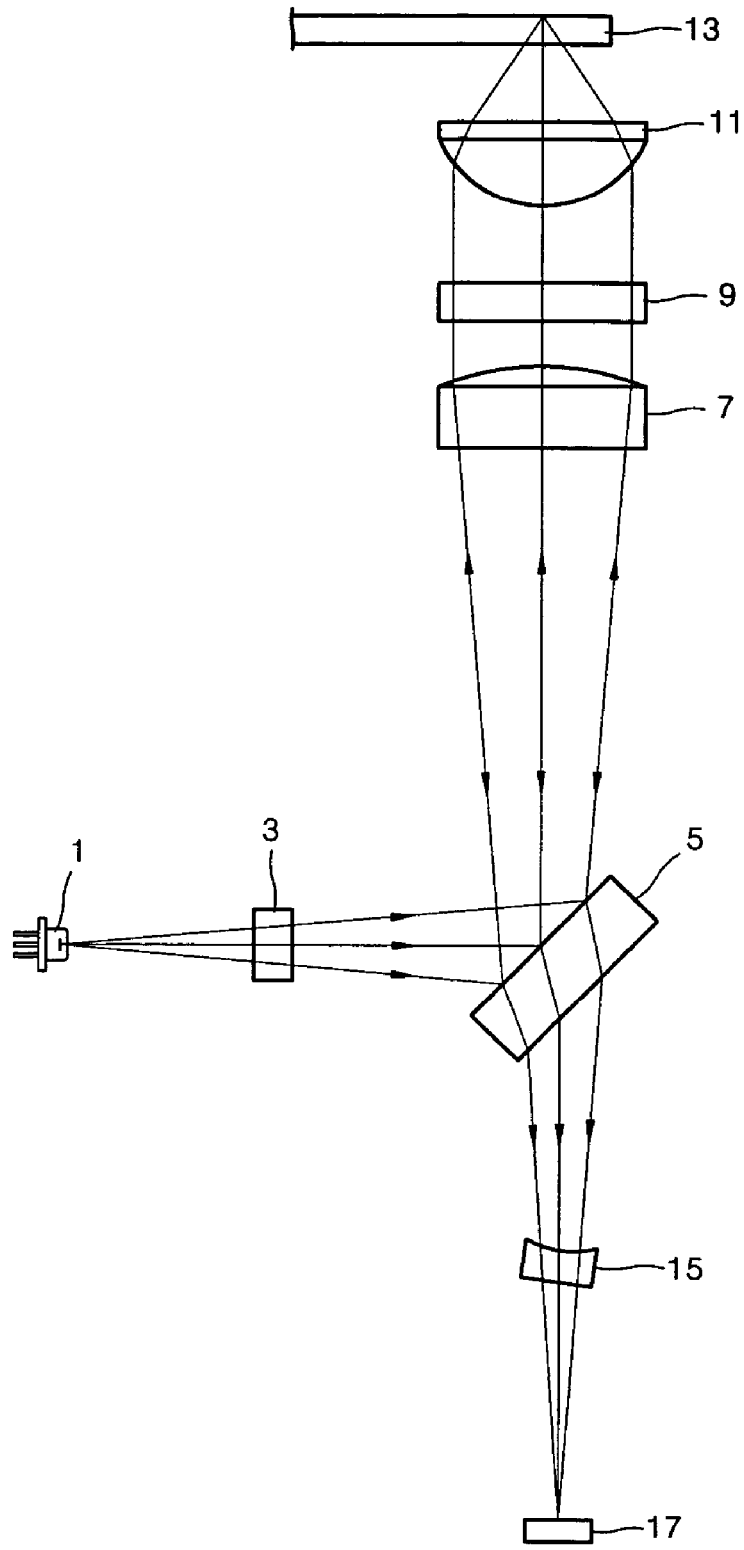
FIG. 1 is a view illustrating the optical configuration of a conventional optical pickup.
Figure 2:
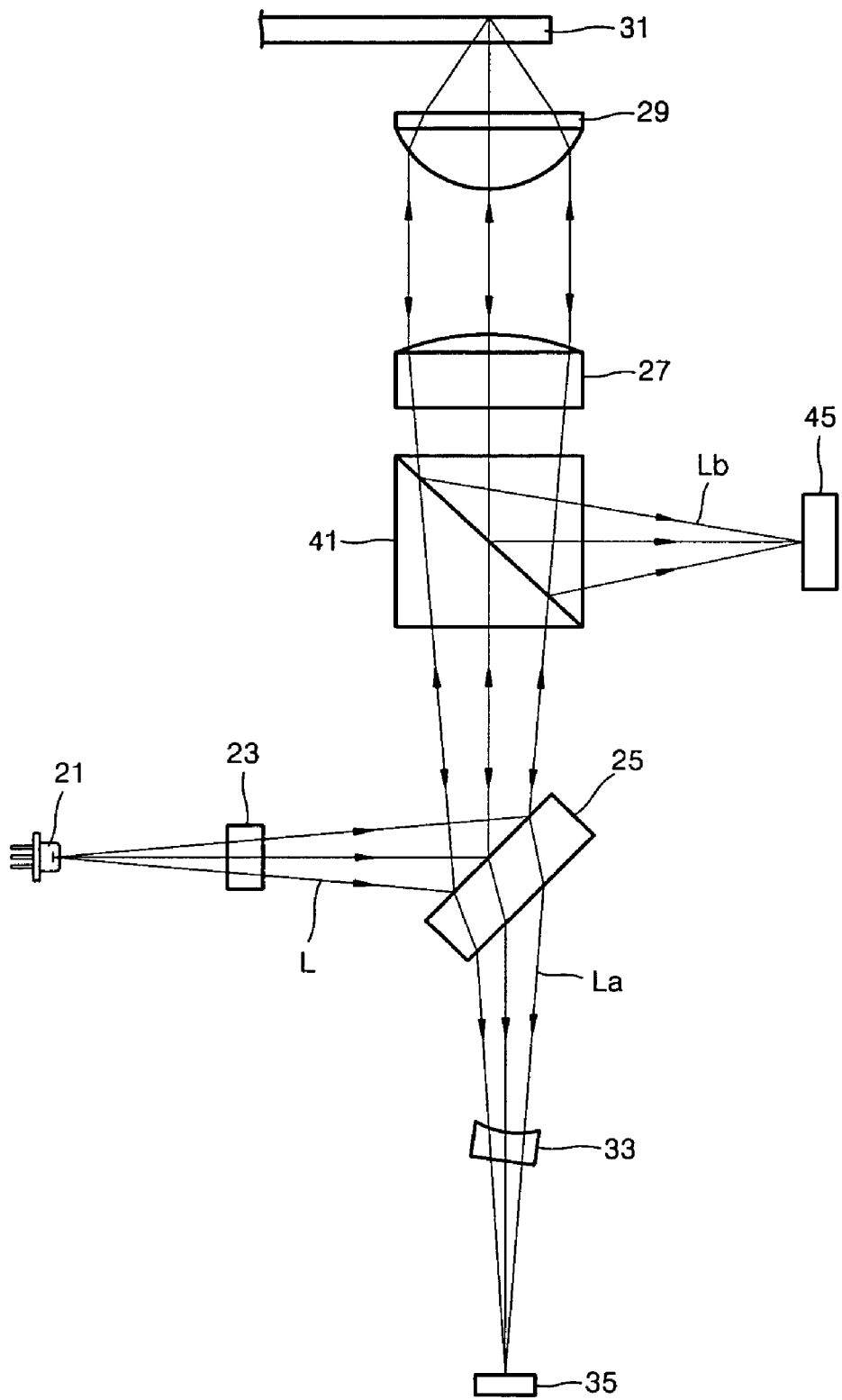
FIG. 2 is a view illustrating the optical configuration of an optical pickup according to an embodiment of the present invention.

Referring to FIG. 2, an optical pickup according to an embodiment of the present invention includes a light source 21 emitting laser light L, a beam splitter 25 changing a proceeding path of incident light, an objective lens 29 focusing incident light to form a light spot on an optical recording medium 31, a polarization beam splitter 41 arranged on an optical path between the beam splitter 25 and the objective lens 29 to transmit light having one polarization, and to reflect light having another polarization, and first and second photodetectors 35 and 45 receiving light reflected from the optical recording medium 31 and detecting an information signal, a focus error signal, and a track error signal.

The beam splitter 25 divides the incident light at a predetermined light amount ratio, for example, 50:50, so as to reflect a portion of light and transmit the other portion of light, thus changing the proceeding path of the incident light. Thus, when the light source 21 is arranged as shown in FIG. 2, the laser light L emitted from the light source 21 is incident on the beam splitter 25 so that a portion of light is reflected therefrom while the other portion thereof is transmitted. The reflected light is used as effective light. For the light reflected from the optical recording medium 31, the light transmitted by the beam splitter 25 is used as effective light. The light source 21 is formed of a semiconductor laser diode that emits light having a particular polarization. Thus, the light emitted from the light source 21 and reflected by the beam splitter 25 is light having a particular polarization direction.

In the optical arrangement of the light source 21 and the beam splitter 25, each can be arranged such that the light transmitted by the beam splitter 25 is used as effective light.

The light emitted from the light source 21 and reflected by the beam splitter 25 is focused by the objective lens 29 and forms a light spot on the optical recording medium 31. The light proceeding toward the optical recording medium 31 has a particular polarization direction according to the polarization property of the light source 21.

The optical recording medium 31 generates birefringence due to the non-uniformity of the medium caused during the manufacturing process as described above. Thus, the light reflected from the optical recording medium 31 is divided into light having a polarization property like the incident light, and light having a different polarization property.

The polarization beam splitter 41 transmits and allows the light having one polarization emitted from the light source 21 to proceed toward the objective lens 29. Of the light reflected from the optical recording medium 31, the polarization beam splitter 41 transmits light having the same polarization as that of the light emitted from the light source 21, and reflects a light having different polarization due to the non-uniformity of a medium forming the optical recording medium 31. That is, the light reflected by the optical recording medium 31 and re-entering the polarization beam splitter 41 is divided to proceed along a first path La and a second path Lb. The polarization beam splitter 41 may have a cubic structure as shown in FIG. 2, or a flat panel structure.

A collimating lens 27 is arranged on the optical path between the beam splitter 25 and the objective lens 29 to focus incident light to make the light proceeding toward the objective lens 29 a parallel beam.

The first photodetector 35 receives incident light that is divided by the polarization beam splitter 41 and proceeding along the first path La. The second photodetector 45 receives incident light that is divided by the polarization beam splitter 41 and proceeding along the second path Lb. The information signal and the error signals can be detected by summing and/or differentiating an electric signal that is received by the first and second photodetectors 35 and 45, and which is photoelectrically converted.

A three-beam method is widely used to detect the track error signal through the first and second photodetectors 35 and 45. For this purpose, a grating 23 is provided on an optical path between the light source 21 and the beam splitter 25 to diffract and transmit incident light as a $0^{th}$ order light, $\pm1^{st}$ order light, and so on.

An astigmatism method is also widely used to detect the focus error signal. For this purpose, an astigmatism lens 33 is provided between the beam splitter 25 and the first photodetector 35. The astigmatism lens 33 is arranged that an opposite inclination direction relative to a direction at which the beam splitter 25 is inclined, so as to correct coma aberration. The astigmatism lens 33 may be a concave lens having a concave column shape. The astigmatism lens 33 transmits incident light to be linear with respect to a direction in which the sectional shape thereof is rectangular, and transmits the incident light to be divergent with respect to a direction in which at least one of the surfaces of the sectional shape thereof is concave as shown in FIG. 2, so that the light of astigmatism is formed on the first photodetector 35.

Figure 3:
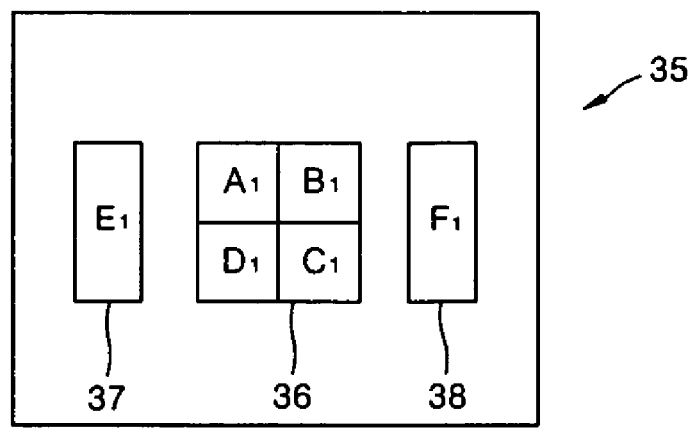
FIG. 3 is a view illustrating a first photodetector of FIG. 2.

Referring to FIG. 3, the first photodetector 35 includes first through fourth sectioned plates $A_1$, $B_1$, $C_1$, and $D_1$ arranged in a shape of a 2-by-2 matrix 36, and fifth and sixth sectioned plates $E_1$ and $F_1$ that are arranged at the left and right sides 37 and 38 of the first through fourth sectioned plates $A_1$, $B_1$, $C_1$, and $D_1$, to detect a track error signal.

Figure 4:
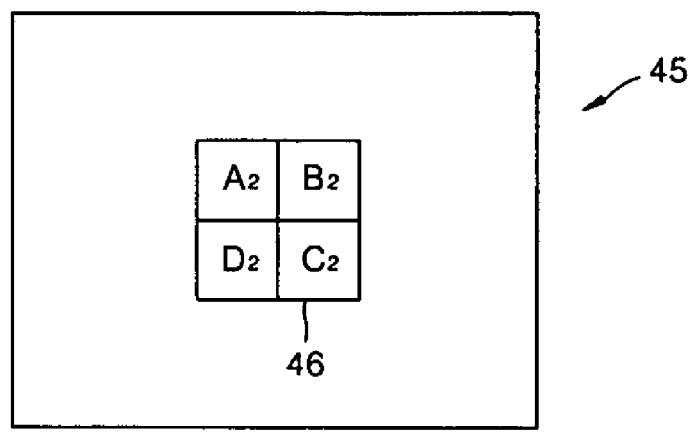
FIG. 4 is a view illustrating an embodiment of a second photodetector of FIG. 2.

Referring to FIG. 4, the second photodetector 45 according to an embodiment of the present invention includes seventh through tenth sectioned plates $A_2$, $B_2$, $C_2$, and $D_2$ also arranged in a shape of a 2-by-2 matrix 46.

The signals detected from the respective first through fourth sectioned plates $A_1$, $B_1$, $C_1$, and $D_1$, and the signals detected from the respective seventh through tenth sectioned plates $A_2$, $B_2$, $C_2$, and $D_2$, are summed. The respective summed signals are differentiated and/or summed so that the focus error signal and the information signal are detected.

That is, the focus error signal (FES) is obtained from a summed signal of the focus error signals detected from the respective first and second photodetectors 35 and 45. This can be expressed as Equation (1).

$$FES=\{(A_1+C_1)-(B_1+D_1)\}+\{(A_2+C_2)-(B_2+D_2)\} \quad (1)$$

The information signal (RFS: radio frequency signal) is obtained from summed signals that are photoelectrically converted from light received by the first through fourth sectioned plates $A_1$, $B_1$, $C_1$, and $D_1$, and the seventh through tenth sectioned plates $A_2$, $B_2$, $C_2$, and $D_2$. This can be expressed as Equation (2).

$$RFS=(A_1+B_1+C_1+D_1)+(A_2+B_2+C_2+D_2) \quad (2)$$

The track error signal (TES: tracking error signal) is detected from the $\pm 1^{st}$ order diffracted beams received by the fifth and sixth sections plates $E_1$ and $F_1$ of the light divided by the grating 23. That is, the track error signal is detected by differentially amplifying the signals photoelectrically converted from the light received by the fifth and sixth sectioned plates $E_1$ and $F_1$. This can be expressed as Equation (3).

$$TES=E_1-F_1 \quad (3)$$

As described above, since the light having different polarization caused by the non-uniformity of the optical recording medium 31 is guided along the second path Lb by the polarization beam splitter 41, and the guided light is then received by the second photodetector 45, periodicity of the detection signal caused by the birefringence can be removed and the amount of detected information signal and focus error signal can be increased, so that signal reproduction performance is improved.

Figure 5:
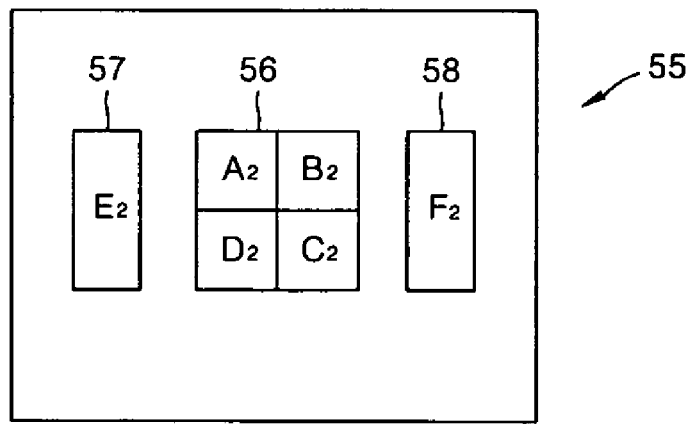
FIG. 5 is a view illustrating another embodiment of the second photodetector of FIG. 2.

FIG. 5 shows another embodiment of the second photodetector 45 of FIG. 2. Referring to FIG. 5, a second photodetector 55 according to another embodiment of the present invention includes the seventh through tenth sectioned plates $A_2$, $B_2$, $C_2$, and $D_2$ arranged in the shape of a 2-by-2 matrix 56, and eleventh and twelfth sectioned plates $E_2$ and $F_2$ that are arranged at the left and right sides 57 and 58 of the seventh through tenth sectioned plates $A_2$, $B_2$, $C_2$, and $D_2$.

The second photodetector 55 differs from the second photodetector 45 of the previous embodiment by including the eleventh and twelfth sectioned plates $E_2$ and $F_2$. Since the optical arrangements of the seventh through tenth sectioned plates $A_2$, $B_2$, $C_2$, and $D_2$ are substantially the same as that of the embodiment shown in FIG. 4, and the method of detecting the focus error signal and the information signal is substantially the same, detailed descriptions thereof will be omitted.

According to the present embodiment, the track error signal TES is detected from the $\pm 1^{st}$ order diffracted beams received by the fifth and sixth sectioned plates $E_1$ and $F_1$, and the $\pm 1^{st}$ order diffracted beams received by the eleventh and twelfth sectioned plates $E_2$ and $F_2$, among the light divided by the grating 23. This can be expressed as Equation (4).

$$TES=(E_1-F_1)+(E_2-F_2) \quad (4)$$

Thus, by providing the eleventh and twelfth sectioned plates $E_2$ and $F_2$ with the second photodetector 45, the track error signal is detected using the signals detected from the fifth and sixth sectioned plates $E_1$ and $F_1$ of the first photodetector 35 so that the sensitivity of a track error signal is improved.

Figure 6:
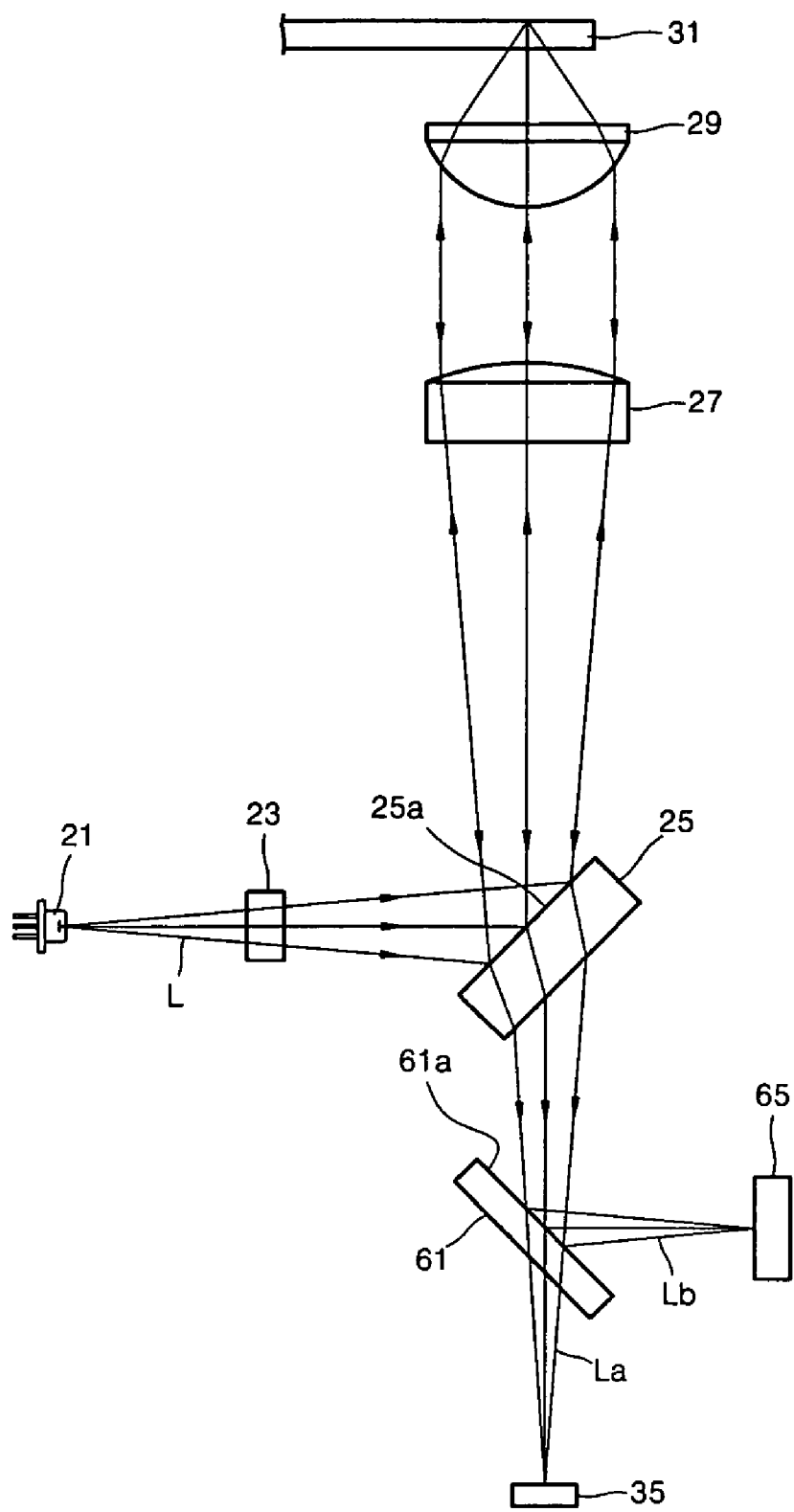
FIG. 6 is a view illustrating the optical configuration of an optical pickup according to another embodiment of the present invention.

Referring to FIG. 6, the optical pickup according to another embodiment of the present invention includes the light source 21 emitting the laser beam L, the beam splitter 25 changing a proceeding path of incident light, the objective lens 29 focusing incident light to form a light spot on the optical recording medium 31, a polarization beam splitter 61 provided on the proceeding path of incident light that is reflected by the optical recording medium 31 and which passes through the beam splitter 25, the first photodetector 35 receiving light having one polarization that is transmitted by the polarization beam splitter 61 and is incident thereon, and a second photodetector 65 receiving light having a different polarization that is reflected by the polarization beam splitter 61. The collimating lens 27 is provided on the optical path between the beam splitter 25 and the objective lens 29 to condense incident light to make the light proceeding toward the objective lens 29 a parallel beam.

To detect the track error signal through the first and second photodetectors 35 and 65 in the three-beam method, the grating 23 is provided on an optical path between the light source 21 and the beam splitter 25 to diffract and transmit incident light as a $0^{th}$ order light, $\pm 1^{st}$ order light, and so on.

In the optical pickup according to the embodiment of the present invention configured as in FIG. 6, since the arrangement of the polarization beam splitter 61 between the beam splitter 25 and the first and second photodetectors 35 and 65 is the substantial difference from the previous embodiment in FIG. 2, descriptions of the substantially similar portions are omitted.

The polarization beam splitter 61 transmits and allows light having one polarization, that is, the incident light that passes through the beam splitter 25 and is incident, to proceed toward the first photodetector 35, and reflects light having different polarization caused by the non-uniformity of a medium forming the optical recording medium 31, toward the second photodetector 65.

Each of the beam splitter 25 and the polarization beam splitter 61 has a flat panel structure in which reflection surfaces 25a and 61a, reflecting part of the incident light, are arranged to be inclined on the optical path. Such a flat panel structure can lower a raw cost when compared to providing a cubic structure, and further allows a small, light optical pickup to be manufactured.

The inclination direction of the beam splitter 25 and the inclination direction of the polarization beam splitter 61 are substantially opposite to each other, as shown in FIG. 6. By arranging the beam splitter 25 and the polarization beam splitter 61 as shown, coma aberration caused by adopting the flat panel structure and arranging the beam splitter 25 and the polarization beam splitter 61 to be inclined can be corrected.

The structure of the sectioned plate of each of the first and second photodetectors 35 and 65 is shown in FIGS. 3 through 5. The information signal and the error signals can be detected by summing and/or differentiating the signals obtained from light received from the first and second photodetectors 35 and 65 according to Equations (1) through (4).

As described above, the optical pickup according to the present invention, guides the light generated by the non-uniformity of an optical recording medium along a different path by using the polarization beam splitter, and provides a second photodetector for receiving the light guided along the different path. Thus, since the information signal and the error signal are detected using all of the light received by the first and second photodetectors, periodicity of the detected signal caused by the non-uniformity of the optical recording medium can be removed. Furthermore, since the amount of the information signal and the error signal that are detected is increased, signal reproduction performance can be improved.

What is claimed is:

1. An optical pickup comprising:
   a light source emitting a laser beam;
   a beam splitter reflecting part of an incident light and straight transmitting the remaining light to change a proceeding path of the incident light;
   an objective lens for focusing the incident light from the beam splitter to form a light spot on an optical recording medium;
   a polarization beam splitter arranged on an optical path of the incident light that is reflected from the optical recording medium and which passes through the beam splitter for transmitting light having one polarization and reflecting light having a different polarization;
   a first photodetector for receiving the light having one polarization that is transmitted by the polarization beam splitter; and
   a second photodetector for receiving the light having a different polarization that is reflected by the polarization beam splitter;
   wherein an information signal and error signals are determined from a signal detected by the first and second photodetectors;
   wherein the first photodetector comprises first through fourth sectioned plates, and fifth and sixth sectioned plates arranged respectively at opposite sides of the first through fourth sectioned plates;
   wherein the second photodetector comprises seventh through tenth sectioned plates, and eleventh and twelfth sectioned plates arranged respectively at opposite sides of the seventh through tenth sectioned plates;
   wherein signals detected from each of the first through fourth sectioned plates and signals detected from each of the seventh through tenth sectioned plates are summed, and each of the summed signals is differentiated and/or summed to determine a focus error signal and an information signal; and
   wherein signals detected from each of the fifth and sixth sectioned plates and signals detected from each of the eleventh and twelfth sectioned plates are differentiated, and each of the differentiated signals is summed to determine a track error signal.

2. The optical pickup as claimed in claim 1, wherein each of the beam splitter and the polarization beam splitter has a flat panel structure in which a reflection surface for reflecting part of an incident light is arranged in an inclined position on the optical path, and wherein the inclination direction of the beam splitter and the inclination direction of the polarization beam splitter are substantially opposite to each other.

3. The optical pickup as claimed in claim 1, further comprising a grating arranged on an optical path between the light source and the beam splitter for diffracting and transmitting incident light into at least three beams.

4. The optical pickup as claimed in claim 1, further comprising a collimating lens arranged on an optical path between the beam splitter and the objective lens for concentrating incident divergent light to make the incident divergent light a parallel beam.

* * * * *